United States Patent
Ng et al.

(10) Patent No.: US 11,226,833 B2
(45) Date of Patent: *Jan. 18, 2022

(54) DETERMINATION AND INITIATION OF A COMPUTING INTERFACE FOR COMPUTER-INITIATED TASK RESPONSE

(71) Applicant: International Business Machines Corporation, Armonk, NY (US)

(72) Inventors: Joanna W. Ng, Unionville (CA); Diana Lau, Richmond Hill (CA); Ioanna Maria Attarian, Toronto (CA); Tinny M. Ng, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/186,984

(22) Filed: Nov. 12, 2018

(65) Prior Publication Data

US 2020/0150982 A1  May 14, 2020

(51) Int. Cl.
*G06F 9/451* (2018.01)
*H04L 29/08* (2006.01)

(52) U.S. Cl.
CPC .............. *G06F 9/451* (2018.02); *H04L 67/22* (2013.01)

(58) Field of Classification Search
CPC .................................. G06F 9/451; H04L 67/22
See application file for complete search history.

(56) References Cited

U.S. PATENT DOCUMENTS

| 5,493,692 A | * | 2/1996 | Theimer | ............ G06Q 10/107 340/5.74 |
| 5,544,321 A | * | 8/1996 | Theimer | ................ G06F 21/35 709/226 |

(Continued)

FOREIGN PATENT DOCUMENTS

| EP | 0823082 | 5/2002 |
| WO | WO2007024704 | 3/2007 |

OTHER PUBLICATIONS

List of IBM Patents or Patent Applications Treated as Related, Jul. 30, 2019, 2 pages.

(Continued)

*Primary Examiner* — Jeremy L Stanley
(74) *Attorney, Agent, or Firm* — Heslin Rothenberg Farley & Mesiti P.C.; Michael A. Petrocelli, Esq.

(57) ABSTRACT

A method, computer program product, and a system where a processor(s) obtains, from a client, permission to access computing device(s) utilized by the client to monitor the client and interact with the client and an identification of each interface of the device(s). The processor(s) obtains a computer-initiated interaction, from a host communicatively coupled to the processor(s), requesting delivery to the client and a response from the client. The processor(s) monitors, via the accessing the computing device(s), activities performed by the client. The processor(s) determines a real-time environmental context of the client at a point in time of receiving the computer-initiated interaction. The processor (s) cognitively analyzes data and metadata of the computer-initiated interaction to determine attributes. The processor(s) designates an interface of a computing device to receive the delivery and to obtain the response.

9 Claims, 5 Drawing Sheets

(56) References Cited

U.S. PATENT DOCUMENTS

| | | | | |
|---|---|---|---|---|
| 7,054,614 | B1* | 5/2006 | Hunzinger | H04M 1/72566 455/411 |
| 7,444,383 | B2* | 10/2008 | Horvitz | H04L 67/12 709/207 |
| 7,945,470 | B1* | 5/2011 | Cohen | G06Q 10/06 705/7.13 |
| 8,738,723 | B1* | 5/2014 | Faaborg | H04L 51/04 709/207 |
| 8,949,420 | B2* | 2/2015 | Banavar | H04L 29/06 709/225 |
| 9,075,435 | B1* | 7/2015 | Noble | G06F 3/013 |
| 9,292,807 | B2* | 3/2016 | Shahine | H04W 4/023 |
| 9,392,389 | B2* | 7/2016 | Hall | H04S 1/002 |
| 9,548,050 | B2* | 1/2017 | Gruber | G10L 15/22 |
| 9,626,693 | B2* | 4/2017 | Smith | G06Q 30/0257 |
| 9,736,675 | B2* | 8/2017 | Erhart | H04M 1/72569 |
| 9,836,620 | B2* | 12/2017 | Jin | H04L 63/20 |
| 10,200,969 | B2* | 2/2019 | Gudivada | H04W 12/02 |
| 2010/0077484 | A1* | 3/2010 | Paretti | G06F 21/6245 726/26 |
| 2011/0167105 | A1* | 7/2011 | Ramakrishnan | G06Q 10/10 709/203 |
| 2012/0309363 | A1* | 12/2012 | Gruber | G06Q 10/109 455/414.1 |
| 2014/0172953 | A1* | 6/2014 | Blanksteen | H04W 4/33 709/203 |
| 2014/0187269 | A1* | 7/2014 | Zinin | H04W 4/021 455/456.3 |
| 2014/0245140 | A1* | 8/2014 | Brown | G06Q 10/06 715/708 |
| 2014/0379404 | A1* | 12/2014 | Bastide | G06Q 10/1095 705/7.19 |
| 2016/0088319 | A1* | 3/2016 | Zucchetta | H04N 21/25816 725/25 |
| 2016/0170991 | A1* | 6/2016 | Birchall | G06F 16/24578 707/751 |
| 2016/0173631 | A1* | 6/2016 | McKay | H04L 67/22 709/203 |
| 2016/0315902 | A1* | 10/2016 | Silva | H04L 51/32 |
| 2016/0330160 | A1* | 11/2016 | Shan | H04L 51/04 |
| 2017/0099592 | A1* | 4/2017 | Loeb | H04L 67/303 |
| 2017/0116195 | A1* | 4/2017 | Ratiu | H04L 51/32 |
| 2017/0118159 | A1* | 4/2017 | Ratiu | H04L 51/26 |
| 2017/0118162 | A1* | 4/2017 | Ratiu | H04L 51/14 |
| 2017/0118303 | A1* | 4/2017 | Ratiu | H04L 67/306 |
| 2017/0118304 | A1* | 4/2017 | Ratiu | H04L 67/42 |
| 2017/0134516 | A1* | 5/2017 | Gutman | H04W 4/21 |
| 2017/0318075 | A1* | 11/2017 | Liensberger | H04L 67/025 |
| 2018/0018337 | A1* | 1/2018 | Raichelgauz | H04H 20/103 |
| 2018/0210738 | A1* | 7/2018 | Roman | G06F 3/167 |
| 2018/0213396 | A1* | 7/2018 | Segal | G10L 15/1822 |
| 2018/0270520 | A1* | 9/2018 | Ott | H04N 21/44218 |
| 2018/0309631 | A1* | 10/2018 | Li | H04L 51/36 |
| 2019/0164547 | A1* | 5/2019 | Yoo | G06F 3/167 |
| 2019/0215289 | A1* | 7/2019 | Raskar | G08B 6/00 |
| 2019/0253519 | A1* | 8/2019 | Milosevic | H04L 67/26 |
| 2019/0313368 | A1* | 10/2019 | Aggarwal | H04W 4/12 |
| 2020/0042295 | A1* | 2/2020 | Straub | G06F 8/20 |
| 2020/0105254 | A1* | 4/2020 | Sarir | H04W 4/02 |
| 2020/0134211 | A1* | 4/2020 | Miller | H04W 12/02 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

* cited by examiner

DETERMINATION AND INITIATION OF A COMPUTING INTERFACE FOR COMPUTER-INITIATED TASK RESPONSE

BACKGROUND

Human users interact with computing nodes (machines) utilizing various interfaces, including, but not limited to, graphical user interfaces (GUIs), command lines, menu-driven interfaces, form-based interfaces, natural language interfaces, and conversational interfaces. By interacting with a computing node through an interface, the user is able to operate and control operations of the computing node. The computing node, by executing program code on at least one processor, can interact with the user through the interface, including by providing feedback.

Selection of interfaces is generally user-driven as any machine-initiated selection is limited. Generally, to initiate communications through an interface, a user must select a device (computing node) and the specific interface (e.g., utilizing point-and-click functionality in a GUI, utilizing a voice-initiated selection in a natural language interface, etc.), before initiating the communication. Meanwhile, machine-initiated interactions (in which the computing node communicates, unprompted by the user, through an interface) are limited to nudges and selected speech. Nudges refer to notification from applications that are rendered in an interface of a computing device and selected speech refers to verbal communications from a smart speaker devices, also referred to as electronic personal assistance devices. Each machine initiated communication is fixated on one designated device and one form of interface.

SUMMARY

Shortcomings of the prior art are overcome and additional advantages are provided through the provision of a method for automatically designating an interface for receipt of a computer-initiated interaction. The method includes, for instance: obtaining, by one or more processors, from a client, permission to access one or more computing devices utilized by the client to monitor the client and interact with the client, wherein, for each computing device, the permission comprises an identification of each interface utilized by the client to interact with the computing device, wherein the client can receive delivery of a computer-initiated interaction and can provide a response to the computer-initiated interaction, via each interface; obtaining, by the one or more processors, the computer-initiated interaction, from a host communicatively coupled to the one or more processors, wherein the computer-initiated interaction requests the delivery to the client and the response from the client; monitoring, by one or more processors, via the accessing the one or more computing devices, activities performed by the client; determining, by the one or more processors, based on the monitoring, a real-time environmental context of the client at a point in time of receiving the computer-initiated interaction; cognitively analyzing, by the one or more processors, data and metadata of the computer-initiated interaction to determine attributes of the computer-initiated interaction; and designating, by the one or more processors, based on the real-time environmental context and one or more attributes of the attributes, the an interface of a computing device selected from the one or more computing devices to receive the delivery and to obtain the response.

Shortcomings of the prior art are overcome and additional advantages are provided through the provision of a computer program product for automatically designating an interface for receipt of a computer-initiated interaction. The computer program product comprises a storage medium readable by a processing circuit and storing instructions for execution by the processing circuit for performing a method. The method includes, for instance: obtaining, by the one or more processors, from a client, permission to access one or more computing devices utilized by the client to monitor the client and interact with the client, wherein, for each computing device, the permission comprises an identification of each interface utilized by the client to interact with the computing device, wherein the client can receive delivery of a computer-initiated interaction and can provide a response to the computer-initiated interaction, via each interface; obtaining, by the one or more processors, the computer-initiated interaction, from a host communicatively coupled to the one or more processors, wherein the computer-initiated interaction requests the delivery to the client and the response from the client; monitoring, by one or more processors, via the accessing the one or more computing devices, activities performed by the client; determining, by the one or more processors, based on the monitoring, a real-time environmental context of the client at a point in time of receiving the computer-initiated interaction; cognitively analyzing, by the one or more processors, data and metadata of the computer-initiated interaction to determine attributes of the computer-initiated interaction; and designating, by the one or more processors, based on the real-time environmental context and one or more attributes of the attributes, the an interface of a computing device selected from the one or more computing devices to receive the delivery and to obtain the response.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 3:
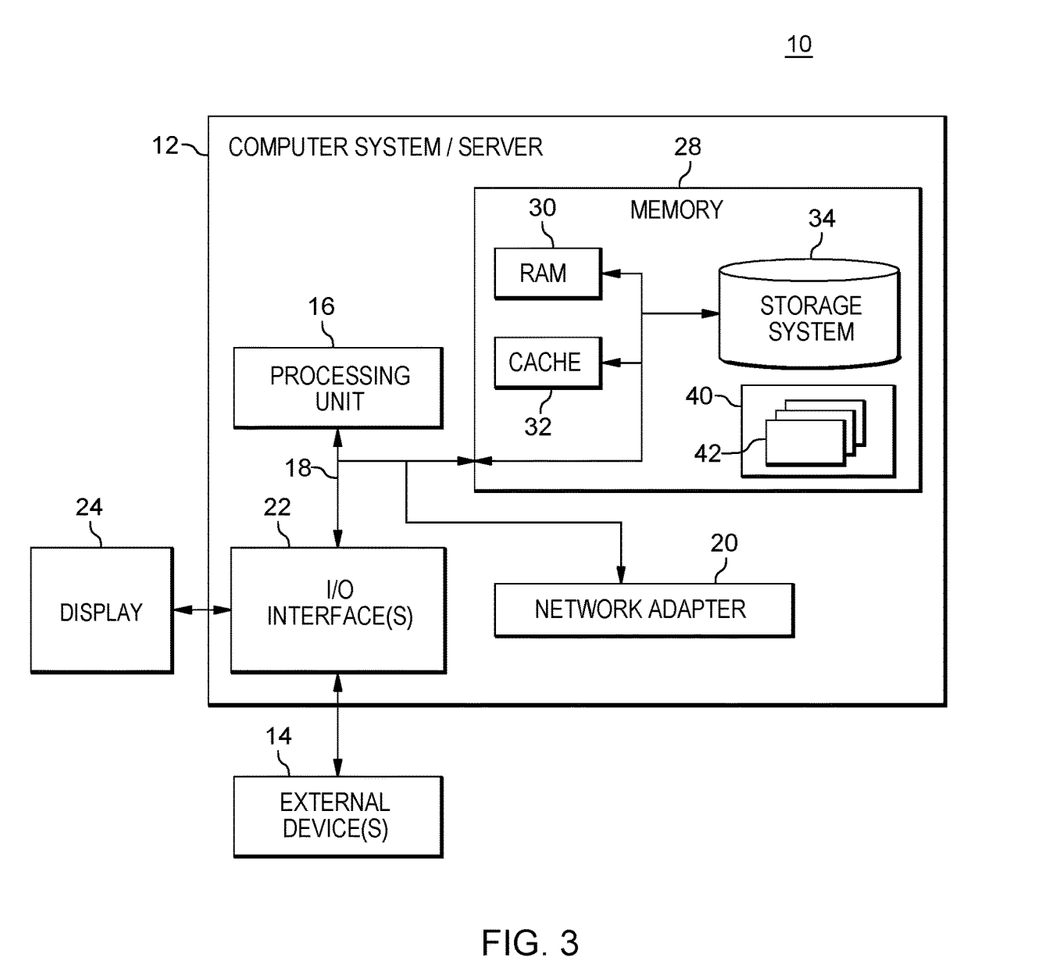
FIG. 3 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 3 as program/utility 40, having a set (at least one) of program modules 42, may be stored in memory 28.

Embodiments of the present invention include a computer-implemented method, a computer program product, and a computing system, where program code executing on one or more processors: 1) receives information identifying a given user and a predetermined set of interaction devices associated with the given user, where each interaction device includes one or more (user) interfaces; 2) initiates an instance of an interaction with the user (e.g., by utilizing a machine-initiated-task model, where the model is based on the predetermined set of interaction devices); 3) determines a context for the interaction, in a real-time, (e.g., utilizing a dynamic interaction-context model); 4) selects, from a subset of the predetermined set of interaction devices, based on availability of the devices for real-time interaction acceptance, and based on the context of the interaction, an interface from the one or more interfaces in which to initiate the instance of the interaction; and 5) initiates the instance of the interaction utilizing the selected interface.

Embodiments of the present invention are both inextricably linked to computing and provide significantly more functionality that existing interface selection systems and methods. First, aspects of various embodiments of the present invention provide an approach to an issue that is, in itself, unique to computing: an individual utilizes multiple devices with multiple interfaces and a task, originated from a device of the user, requests a response from the user, through one of the interfaces. Based on the context in which the user is responding to the task, the program code in embodiments of the present invention, selects an interface for the response. In some embodiments of the present invention, the program code selects a most appropriate interface with which the user can provide the response. Providing a response to a task, from a computing device, via a computing device which is contextually sensitive (based on the program code determining the context), are aspects that are inextricably linked to computing. Second, embodiments of the present invention provide significant functionality beyond existing interface selection approaches, which do not utilize the context in which a user response will be provided, in selecting a device and an interface with which to provide the response. In embodiments of the present invention, unlike in existing selecting approaches, program code selects a contextually sensitive interface and device for electronic interactions with a user, who has enabled multiple devices, with multiple interfaces, for this type of communication. Unlike in existing interface selection approached, in embodiments of the present invention, the program code dynamically selects a device (once the user has registered the device to opt into this functionality), an interface, and a format, to utilize when delivering a take to a user and/or responding to the task. The context utilized in this dynamic selection is temporal, thus, a selected context is selected based on contextual sensitivity to a given time at which a task is to be delivered and/or responded to, by the user.

Figure 1:
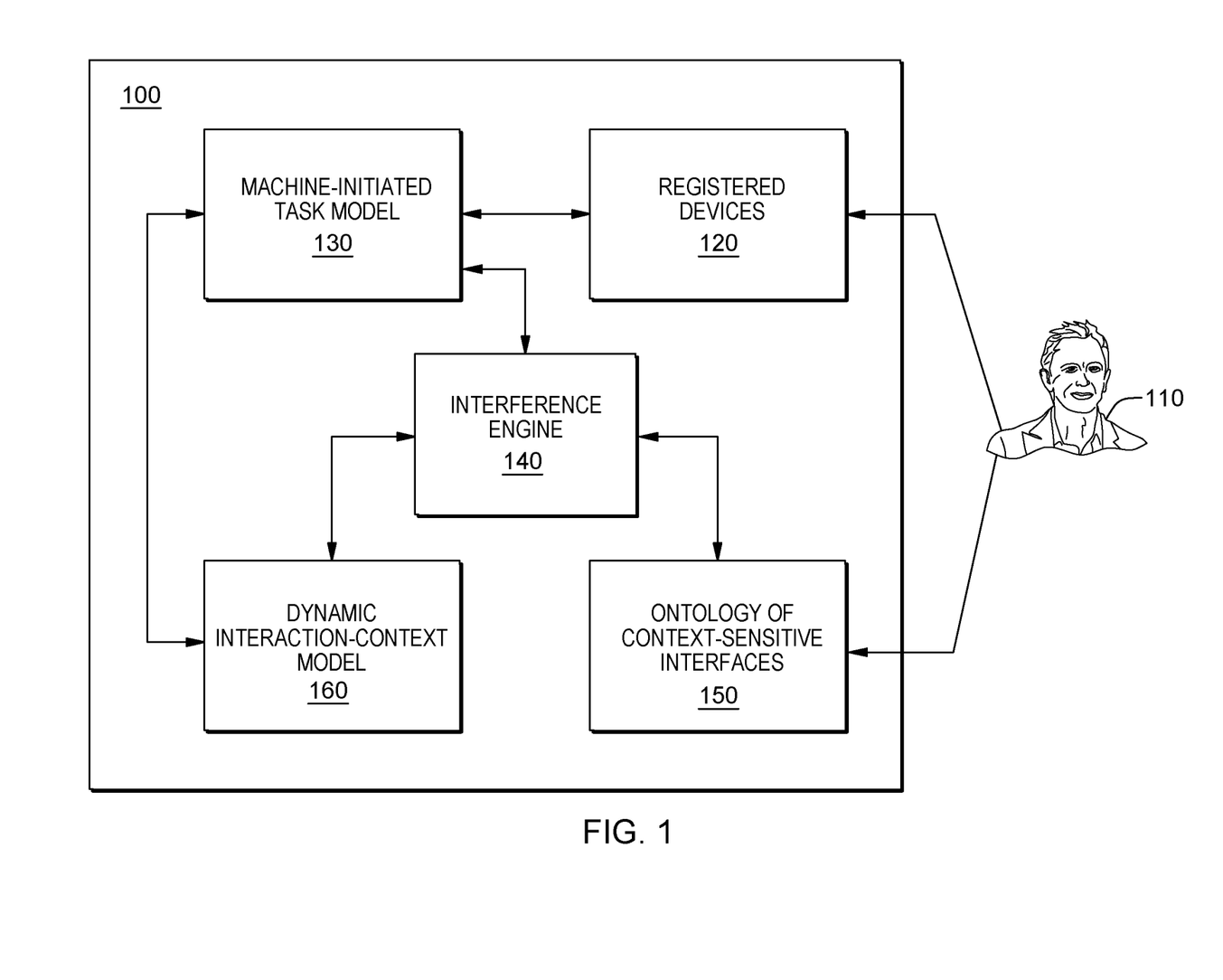
FIG. 1 is a technical environment into which various aspects of the present invention have been implemented.

FIG. 1 provides an overview of a technical environment 100 into which aspects of the present invention can be integrated. Various aspects of the program code in embodiments of the present invention are illustrated in FIG. 1 as separate modules. The separation of aspects into modules in FIG. 1 is provided for illustrative purposes only and is not meant to suggest or introduce any limitations regarding the implementation of the program code in embodiments of the present invention that perform the described aspects. However, by separating certain aspects into separate modules, these aspects can be illustrated with clarity.

Referring to FIG. 1, a user 110 interacts with various devices and computing resources that comprise the technical environment 100. Although embodiments of the present invention can accommodate multiple users, a single user 110 is utilized in FIG. 1 to simplify the illustration. Thus, the user 110 utilizes one or more user devices 120, which are known to the program code executing on one or more processing. The program code knows that the user 110 utilizes the user devices 120, because the user 110 registered the devices 120. Through the registration of the devices 120, the program code obtains data identifying the devices 120 and the interfaces of the devices for use in communicating with the user. Through the registration process, which the user can accomplish utilizing a graphical user interface (GUI) on a device of the devices 120, the user grants the program code permission to utilize the interfaces of the devices 120 for communicating tasks to the user 110 and obtaining user 110 responses to the tasks. In enabling a device 120 as a possible device for the program code to select and utilize responsive to a task (i.e., for human-machine interactions), the user can provide identifying information about the device to the program code, including but not limited to: 1) device type; 2) interface capability or capabilities of the device (e.g., GUI, text, speech, etc.); and/or 3) a priority of ranking for the device (e.g., a binary indicator of primary or secondary, a scaled ranking, etc.).

In embodiments of the present invention, when an application executing on a computing resource initiates an interaction with the user 110, it creates an instance of a task, which is illustrated in FIG. 1 which is utilized by program code of a machine-initiated task model 130. Each task can be understood as a request to a user 110 to which the user 110 responds utilizes one or more of the devices 120. Program code comprising the machine-initiated task model 130 captures characteristics of instances of machine-initiated interactions with the user 110. These characteristics can include privacy and/or security settings related to content of a task or an anticipated response to a task, including, but are not limited to: 1) whether the task itself or a response to the task would include encrypted content, including personally identifiable information or personal health or financial data; and/or 2) whether the task or a response to the task includes publicly available information (e.g., weather, stock prices, etc.). These characteristics can include cognitive data and/or expressions related to content of a task or an anticipated response to a task, including, but are not limited to: 1) whether the task itself or a response to the task would include speech; 2) whether the task itself or a response to the task would utilize text; 3) whether the task itself or a response to the task would utilize a GUI; and/or 4) whether the task itself or a response to the task would utilize email. Other characteristics obtained by the program code comprising the machine-initiated task model 130 can include, but are not limited to a complexity of a task (e.g., selected from a rating (e.g., high, medium, low) and/or inferred by the program code), the task urgency, and/or metadata related to the task from which characteristics of the task can be inferred (e.g., hashtags).

As discussed above, in some embodiments of the present invention, when an application initiates a task or an instance of a task (e.g., utilizing the machine-initiated task model 130), the program code determines an interface of the interfaces of the device 120 both for delivery of the task and from which to obtain a response to the task. To this end, in embodiments of the present invention, program code illustrated as an interference engine 140, intercepts each task from the machine-initiated task model 130, and determines which interface(s) to utilize based on one or more of a dynamic interaction-context model 160 and an ontology of context-sensitive interfaces 150 (i.e., a set of concepts and categories that show the properties of the interfaces of the devices 120 and the relationships between them). The program code of the interference engine 140 selects one or more interfaces from the devices 120 based on information related to the task instance itself, information from the machine-initiated task model 130, information from the dynamic interaction-context model 160, and axioms of the ontology of context-sensitive interfaces 150. The program code determines which device of the devices 120 and an interface to use in communicating the task to the user 110, at the time of the determination and/or at the time that the program code anticipates that the user will receive the task.

In embodiments of the present invention, program code comprising the dynamic interaction-context model 160 determines temporal conditions related to a user 110 at a time when the user 110 would receive a machine-initiated task, that affect if and how a user can receive the task and respond to the task, via an interface of a device 120. In embodiments of the present invention, program code comprising the dynamic interaction-context model 160 determines various contextual elements, including, but not limited to: 1) connectivity settings that can be utilized at the given time to communicate with a user 110 via a device 120 (e.g., WiFi, Bluetooth, GSM (Global System for Mobile communication), etc.); 2) location of the user 110; 3) time of day; 4) activity a user 110 is engaged in at the time (e.g., based on an electronic calendaring system which the user 110 previously enabled the program code to access); 5) social context of the user 110 at the time (e.g., alone, in a group, in a public space, in a private space, etc.).

In some embodiments of the present invention, the devices 120 of the user 110 can include one or more Internet of Things (IoT) devices and the program code, based on being enabled by the user 110, can assess the context of a user 110 at a given time, based on obtaining data from these devices 120. As understood by one of skill in the art, the Internet of Things (IoT) is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object, including but not limited to, temperature and humidity. The smart sensors can be utilized to measure temperature, humidity, vibrations, motion, light, pressure and/or altitude. IoT devices also include individual activity and fitness trackers, which include (wearable) devices or applications that include smart sensors for monitoring and tracking fitness-related metrics such as distance walked or run, calorie consumption, and in some cases heartbeat and quality of sleep and include smartwatches that are synced to a computer or smartphone for long-term data tracking. IoT devices also include Smart home devices, digital assistants, and home entertainment devices. In embodiments of the present invention, the IoT devices of the user (included in the devices 120) can be utilized by the program code of the dynamic interaction-context model 160 to determine, with the prior authorization of the user 110, a location of the user 110 (e.g., based on location devices in IoT devices), the activity (or type of activity) a user 110 is engaged in at the time (e.g., based on data from a fitness tracker), and/or the social context of the user 110 at the time (e.g., based on smart sensors in the environment). Because the smart sensors in IoT devices carry unique identifiers, program code of the dynamic interaction-context model 160 that communicates with a given sensor can identify the source of the information.

As aforementioned, the program code of the interference engine 140 selects one or more interfaces from the devices 120 based on information related to the task instance itself, information from the machine-initiated task model 130, information from the dynamic interaction-context model 160, and axioms of the ontology of context-sensitive interfaces 150. In embodiments of the present invention, the axioms of the ontology of context-sensitive interfaces 150 can include both an inherent ontology of context-sensitive interfaces and/or user-established axioms pertaining to factors related to the machine-initiated task model 130 and/or the dynamic interaction-context model 160. The inherent ontology is established ontological knowledge of contextual sensitive interfaces and devices pertaining to factors coming from instances initiated by the machine-initiated task model 130 and the dynamic interaction-context model 160.

Non-limiting examples of inherent ontology utilized as axioms of the ontology of context-sensitive interfaces 150, are listed below.

1) In some embodiments of the present invention, per the machine-initiated task model 130, when the cognitive expression for a task is speech, the privacy setting is not private.

2) In some embodiments of the present invention, when the program code of the dynamic interaction-context model 160 indicates that a user is engaged in an activity of being in a meeting (e.g., per a calendaring application on a user device 120 accessed by the program code with the permission of the user 110), a task should not be delivered to a user that a machine-initiated task model 130 determined has a context or expression that calls for an audible delivery or a spoken response.

3) In some embodiments of the present invention, when the program code of the dynamic interaction-context model 160 indicates that a user is engaged in an activity of being in a meeting (e.g., per a calendaring application on a user device 120 accessed by the program code with the permission of the user 110), a task can be delivered to a user that a machine-initiated task model 130 determined has a context or expression that calls for delivery and/or response via a GUI and/or textual entry.

Non-limiting examples of user-established axioms pertaining to factors related to the machine-initiated task model 130 and/or the dynamic interaction-context model 160, are listed below.

1) In some embodiments of the present invention an axiom includes an instruction to deliver only tasks that call for delivery and/or response via textual display and entry when program code of the dynamic interaction-context model 160 indicates that a user is engaged in an activity of being in a meeting (e.g., per a calendaring application on a user device 120 accessed by the program code with the permission of the user 110).

2) In some embodiments of the present invention an axiom includes an instruction to deliver only tasks that call for delivery and/or response via email when the machine-initiated task model 130 determines that the task includes complex content.

3) In some embodiments of the present invention, an axiom includes an instruction that when the machine-initiated task model 130 determines that the subject metadata shows that the task is related to finance, that a given task is private.

4) In some embodiments of the present invention, an axiom includes an instruction that when the machine-initiated task model 130 determines that the subject metadata shows that the task is related to medical or health issues, that a given task is private.

As discussed above, in some embodiments of the present invention, program code of the interference engine 140, intercepts each task from the machine-initiated task model 130 (which has generated contextual data for the task), and determines which interface(s) to utilize based on one or more of the dynamic interaction-context model 160 (which determines temporal conditions related to a user 110 at a time when the user 110 would receive a machine-initiated task) and the ontology of context-sensitive interfaces 150 (i.e., inherent ontology of context-sensitive interfaces and user-established axioms pertaining to factors related to the machine-initiated task model 130 and/or the dynamic interaction-context model 160). Upon intercepting the task (or instance of the task), the program code of the interference engine 140 determines a context-sensitive interface and selects an interface of a device 120 for delivery of the task and/or for obtaining a response to the task. In various embodiments of the present invention, program code of the interference engine 140 can designate this inference based on one or more of: subject metadata (as identified by program code of the machine-initiated task model 130) and/or one or more axioms of the ontology of context-sensitive interfaces 150. An example of an interference engine 140 interface determination based on a subject would be program code of an interference engine 140 identifying that program code of the machine-initiated task model 130 determined that a given task included a subject "vital signs." Based on making this determination, the program code of the machine-initiated task model 130 generated an instance of this task with a hashtag indicating this subject. Upon intercepting the instance, program code comprising the ontology of context-sensitive interfaces 150 determines that the "vital signs" tag indicates that the task is related to a class of "health" and determines that the task is private, whether or not the task was marked private by the machine-initiated task model 130. Thus, the program code of the interference engine 140 determines that the intercepted instance of the task is private, based on axioms in the ontology of context-sensitive interfaces 150.

The non-limiting scenario below illustrates the functionality of certain aspects of the present invention and also illustrates the utility of the program code, based on the context in which the user is responding to the task, selecting an interface for task delivery and response. This scenario is described in a medical treatment environment because this type of environment carries with it security and privacy concerns, which are addressed by the program code in embodiments of the present invention. In this scenario, Dr. Smith, a physician, has previously registered his devices (e.g., mobile phone, work laptop, smart car and home network) and acquiesced to the program code accessing the interfaces of these device for task delivery (machine-initiated interaction). As part of registering the devices, Dr. Smith configured desired priorities for each device, aside from a default declared.

Dr. Smith, in the privacy of Dr. Smith's office, utilizes a smart speaker on a device and designates a task, utilizing a voice interface. Specifically, Dr. Smith requests a notification when test results for a given patient, Pat Jones, as available. At the time when the test results were ready and the task could be delivered, the program code determines that Dr. Smith is in a public environment (e.g., in the cafeteria). Thus, rather than provide the results to Dr. Smith utilizing the voice interface utilized by Dr. Smith to configure the task, the program code determines that given the privacy associated with the task and the public nature of the context in which Dr. Smith will be received the test results, the program code delivers a text message to Dr. Smith, via a registered device of Dr. Smith, alerting Dr. Smith that the results are ready. Because of the public context in which Dr. Smith is being alerted to the availability of the results, the program code does not include the actual results in the notification and also, provides the notification via a text message. The program code delivers the results themselves to an email inbox (on a secure mail server that is internal to the medical facility) and Dr. Smith is able to check the results by accessing this inbox, utilizing credentials. The program code obtains a reply from Dr. Smith via a text, instead of via a voice interface, as the instructions can involve medical treatment instructions regarding Pat Jones, which the program code understands to be private and should not be received via a voice interface in a public place. The privacy configurations provided in this example are non-limiting and provided for illustrative purposes only, as embodiments of the present invention allow flexibility in configuring the program code (e.g., through the axioms comprising the ontology of context-sensitive interfaces 150), to address privacy and security concerns across varied environments and in compliance with various policies.

In an embodiments of the present invention utilized by Dr. Smith, the program code selected the text interface based on a number of factors. Because the task included medical results, the program code in an embodiments of the present invention analyzed this task (e.g., machine-initiated task model 130) and populated or located an indicator of the subject (e.g., metadata hashtag #health), and determined, based on context of the task (instance) that the medical results are considered to be private. The availability of Pat Jones' results triggered a notification and thus, the program code in an embodiments of the present invention, determined what device and interface should be utilized to convey the message (e.g., interface engine 140).

In the example above, Dr. Smith was in a public place and for at least this reason, the program code (e.g., via interface engine 140) selected a text interface over the registered mobile phone. Additionally, the program code configured the notification itself to exclude personally identifiable information or private information, given that the notification would occur within a public place. But looking at another example, in some embodiments of the present invention, the program code can work through various priorities and contextual elements to determine which interface and device should be utilized to interact with a user, in this example, Dr. Smith. If Dr. Smith designated a registered smart car as a primary device (or if the program code determined this priority based on historical data), and/or the program code determined that Dr. Smith was driving (e.g., via dynamic interaction-context model 160), the program code (e.g., via interface engine 140) could infer that conveying the message over speech would be the only acceptable form of communication.

If Dr. Smith is not driving (as determined by the dynamic interaction-context model 160, via the smart car), the program code can determine (in this example) that because Dr. Smith's laptop in connected, and has been assigned (automatically through machine learning of historical data or at registration) a second level of priority, Dr. Smith is likely at work (e.g., via dynamic interaction-context model 160). The program code can then determine whether Dr. Smith is available to receive messages delivered via the laptop in real-time. The program code can make this determination by accessing a calendar application on Dr. Smith's home network, to which the program code has been given permission by Dr. Smith (e.g., via dynamic interaction-context model 160). If the program code determined that Dr. Smith is in a meeting, based on the calendar, the program code would exclude speech notification and determine that GUI notification on the laptop is most appropriate. If no meeting is shown, the program code can determine a likelihood that Dr. Smith is in a private space and can notify Dr. Smith via a text notification on the registered mobile phone, unless a custom configuration by the user, Dr. Smith, overrides this determination.

Continuing this example, if the work laptop is not in vicinity but the home network is, the program code can determine that Dr. Smith is at home. Depending on the aforementioned calendar, the program code can determine which type of notification would be most appropriate (e.g., Dr. Smith may be sleeping or be otherwise engaged). The program code can also factor urgency of an interaction into device and interface choice and if specific patient results have been flagged as urgent (as determined by the machine-initiated task model 130), the program code can deliver the task in a manner that reflects this urgency, for example, delivering a text message even when user settings indicate a preference for an email because a text message will be received faster.

Figure 2:
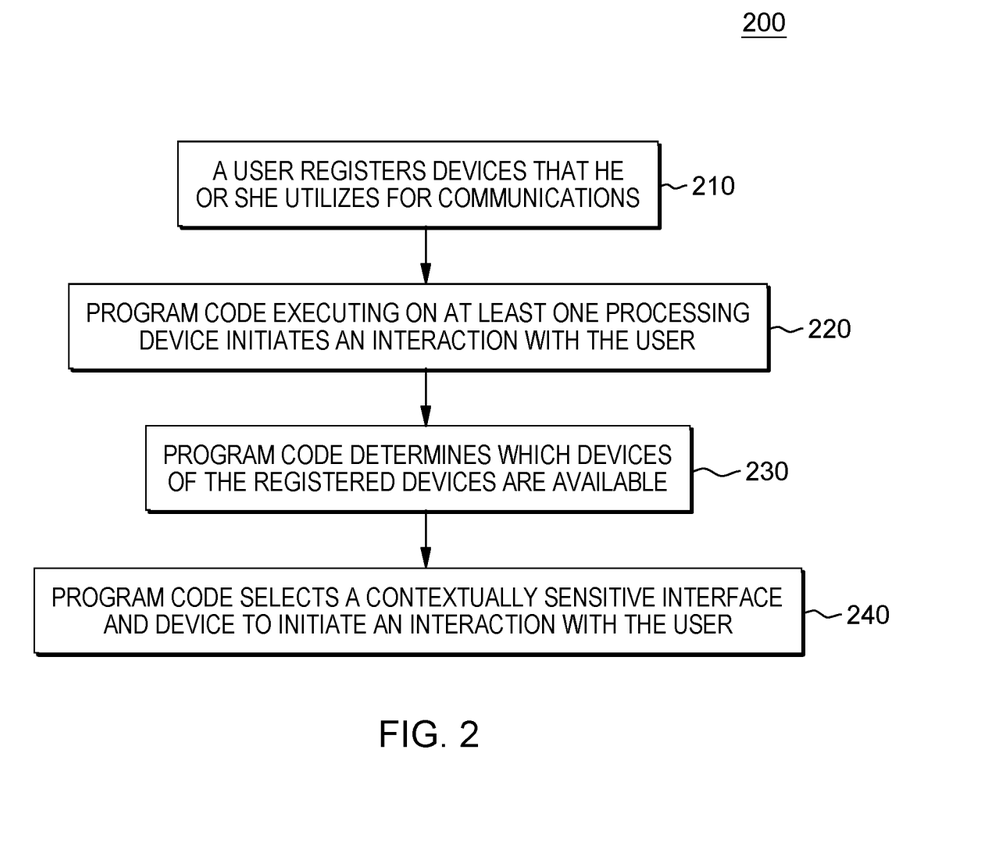
FIG. 2 is a workflow illustrating certain aspects of an embodiment of the present invention.

FIG. 2 is a workflow 200 that illustrates certain aspects of some embodiments of the present invention. In an embodiment of the present invention, a user registers devices that he or she utilizes for communications (210). In some embodiments of the present invention, the registration process includes creating device profile for each registered device, where the user indicates (and/or the program code determines, post-registration), the supported interfaces on each device. The user can also designate a primary device of the registered devices and/or the program code can automatically determine which device is the primary device, based on monitoring usage of the devices by the user, with the permission of the user. Thus, the program code can utilize machine learning and determine a user's primary device, based on a user's historic device usage data.

In some embodiments of the present invention, program code executing on at least one processing device initiates an interaction with the user (220). As part of initiating the interaction, the program code generates two meta-data instances: 1) an instance of a machine-initiated task utilizing program code comprising a machine-initiated task model (e.g., FIG. 1, 130), based on the registered devices (e.g., FIG. 1, 120), which determines which interfaces would support the interaction; and 2) a real-time instance of an interaction context, utilizing program code comprising a dynamic interaction-context model (e.g., FIG. 1, 160). The program code of the machine-initiated task model (e.g., FIG. 1, 130) analyzes the interaction and/or the instance to gather data surrounding the instance that would impact the interface selected (subject, privacy, etc.). Meanwhile, program code of the dynamic interaction-context model (e.g., FIG. 1, 160) determines environmental and contextual conditions in which the user will receive and respond to the interaction, in real-time (e.g., private space, public space, etc.). In performing both the analysis of the instance and the real-time context of the user, when the user would receive the instance, the program code can utilize a cognitive agent.

An example of one cognitive agent that the program code can utilize both to analyze the task as well as the environmental context of the user, is IBM Watson®. IBM Watson® is a product of International Business Machines Corporation. IBM Watson® is a registered trademark of International Business Machines Corporation, Armonk, N.Y., US. IBM Watson® is a non-limiting example of a cognitive agent that can be utilized in some embodiments of the present invention and is discussed for illustrative purposes, only, and not to imply, implicitly or explicitly, any limitations regarding cognitive agents that can comprise aspects of embodiments of the present invention.

In some embodiments of the present invention that utilize IBM Watson® as a cognitive agent, the program code interfaces with IBM Watson® Application Program Interfaces (APIs) to perform a cognitive analysis of obtained data, both data related to the instance or task as well as data related to the environment of the user. Although not all embodiments of the present invention utilize an existing cognitive agent, utilizing an existing cognitive agent, such as IBM Watson®, or similar cognitive agents with APIs that can process various types of data, can expand the type of data that the program code can access to pass to the inference engine 140 program code, enabling this program code to select a registered device 120 and interface. For example, data that comprises an interaction, instance or task, can include documentary, visual, and audio data, which the program code can process, based on its utilization of IBM Watson® and/or another cognitive agent with this capability. Specifically, in some embodiments of the present invention, certain of the APIs of the IBM Watson® API comprise a cognitive agent that includes one or more programs, including, but are not limited to, natural language classifiers, Retrieve and Rank (i.e., a service available through the IBM Watson® Developer Cloud that can surface the most relevant information from a collection of documents), concepts/visual insights, trade off analytics, document conversion, and/or relationship extraction. For example, in an embodiment of the present invention, one or more programs analyze the data obtained by the program code utilizing one or more of a natural language classifier, retrieve and rank APIs, and trade off analytics APIs. The IBM Watson® API can also provide audio related API services, in the event that the data includes audio (which is often part of environmental context data), which can be utilized by the program code, including but not limited to speech recognition, natural language processing, text to speech capabilities, and/or translation. Various other APIs and third party solutions outside of IBM Watson® can also provide this functionality in embodiments of the present invention.

Returning to FIG. 2, the program code determines which devices of the registered devices are available (230). To this end, the program code dynamically determines which devices are connected to a network and thus available to receive tasks in real-time and removes any disconnected devices and the program code removes any devices that have no interface to support the interaction, as determined by the program code of the machine-initiated task model (e.g., FIG. 1, 130).

In some embodiments of the present invention, the program code selects a contextually sensitive interface and device to initiate an interaction with the user (240). In selecting the device and interface, the program code utilizes a context-sensitive ontology (e.g., FIG. 1, 150), which includes user-established axioms. A user can establish axioms by providing feedback regarding selections made by the program code and based in this feedback, the program code generates and retains axioms. Additionally, the program code (with permission) monitors user choices regarding device use and generates axioms that reflect these choices. In embodiments of the present invention, program code comprising an interference engine (e.g., FIG. 1, 140), which selects the interface and device, based on a sensitivity to the context in which an interaction will take place, utilizes data from the program code of the machine-initiated task model (e.g., FIG. 1, 130), which analyzes the interaction request, for data that would indicate a context: subject, privacy, etc. Thus, program code comprising an interference engine (e.g., FIG. 1, 140), utilizes data relevant to the instance (from the analysis of the machine-initiated task model (e.g., FIG. 1, 130)), contextual environmental data, from the dynamic interaction-context instance (e.g., FIG. 1, 160), and axioms in the ontology (e.g., FIG. 1, 150), to infer a choice of context-sensitive-interface and device for the machine-initiated interaction with the user.

Embodiments of the present invention include a computer-implemented method, a computer program product, and a computer system, where program code executing on one or more processors, obtains, from a client, permission to access one or more computing devices utilized by the client to monitor the client and interact with the client, where, for each computing device, the permission comprises an identification of each interface utilized by the client to interact with the computing device, where the client can receive delivery of a computer-initiated interaction and can provide a response to the computer-initiated interaction, via each interface. The program code obtains the computer-initiated interaction, from a host communicatively coupled to the one or more processors, where the computer-initiated interaction requests the delivery to the client and the response from the client. The program code monitors, via the accessing the one or more computing devices, activities performed by the client. The program code determines, based on the monitoring, a real-time environmental context of the client at a point in time of receiving the computer-initiated interaction. The program code cognitively analyzes data and metadata of the computer-initiated interaction to determine attributes of the computer-initiated interaction. The program code designates, based on the real-time environmental context and one or more attributes of the attributes, an interface of a computing device selected from the one or more computing devices to receive the delivery and to obtain the response.

In some embodiments of the present invention, the program code transmits the computer-initiated interaction, to the designated interface of the computing device at the point in time.

In some embodiments of the present invention, the program code determines an order of priority relative to the one or more computing devices, for each computing device of the one or more computing devices, where the designating comprises evaluating each interface in the order, based on the real-time environmental context and one or more attributes of the attributes, and where the designated interface in an interface of a highest priority computing device of the one or more computing devices.

In some embodiments of the present invention, the program code determines the order by: monitoring computing activities performed on the one or more computing devices, and determining, based on frequency of the monitored computing activities, preferences of the client related to the one or more computing devices.

In some embodiments of the present invention, the program code determines the order by: obtaining, via a selected device of the one or more computing devices, via an interface, one or more priority designations for the one or more computing devices.

In some embodiments of the present invention, the program code designates the interface of the computing device also by: comparing the real-time environmental context and the one or more attributes to an ontology of context-sensitive interfaces, identifying within the ontology, one or more axioms relevant to the real-time environmental context and the one or more attributes, and designating the interface of the computing device further, based on the identified one or more axioms.

In some embodiments of the present invention, the program code generates the one or more axioms. The program code can generate the axioms by obtaining, via a selected device of the one or more computing devices, via an interface, one or more axioms. The program code can generate the axioms by monitoring computing activities performed on the one or more computing devices, and configuring the one or more axioms, based on the monitored computing activities.

In some embodiments of the present invention, the program code selects the one or more attributes from the group consisting of: subject, priority, privacy level, and security level.

In some embodiments of the present invention, the real-time environmental context of the client at the point in time is selected from the group consisting of: public and private.

In some embodiments of the present invention, the program code obtains the response to the computer-initiated interaction, via the designated interface of the computing.

In some embodiments of the present invention, the program code selects each interface from the group consisting of: text, voice, haptic, command line, graphical user interface, menu driven interface, form-based interface, and natural language interface.

In some embodiments of the present invention, the program code determines, based on the monitoring, an availability of each of the one or more computing devices to receive the computer-initiated interaction, at the point in time, based on evaluating connectivity between each of the one or more computing devices and the one or more processors, where designating the interface of the computing device further comprises: the program code verifying that the computing device comprising the interface is available. The program code can transmit the computer-initiated interaction, to the designated interface of the computing device at the point in time, based on the verifying.

Referring now to FIG. 3, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention the one or more servers executing the program code of the machine-initiated task model 130 (FIG. 1), the interference engine 140 (FIG. 1), the dynamic interaction-context model 160, and the context-sensitive interfaces 150 (FIG. 1), as well as one or more of the registered devices 120 (FIG. 1), can each be understood as a cloud computing node 10 (FIG. 3) and if not a cloud computing node 10, then one or more general computing nodes that include aspects of the cloud computing node 10. Various examples of these resources may, together, comprise a hybrid cloud.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
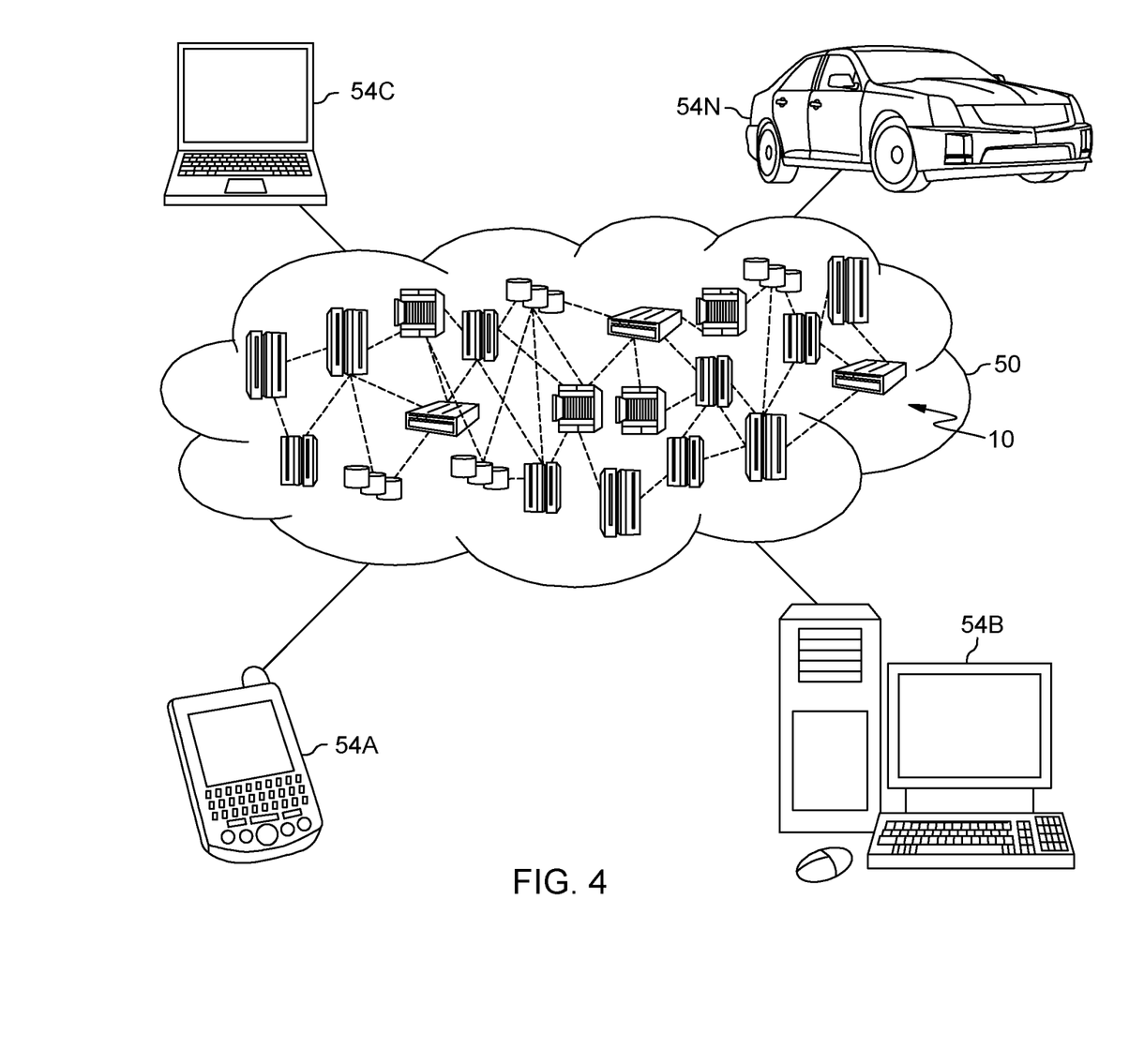
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
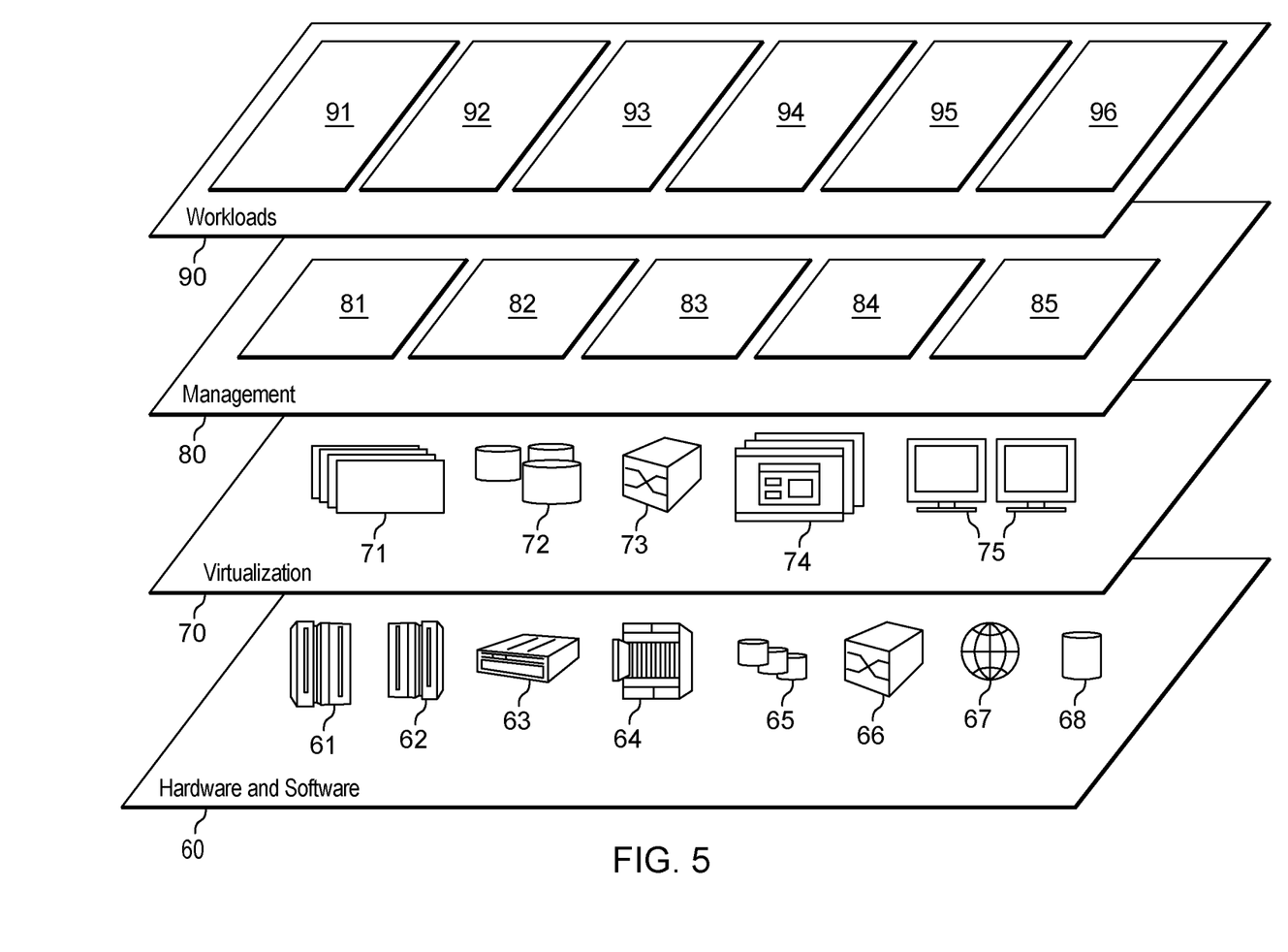
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selecting a context-sensitive interface for machine-initiated interaction with a user 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:
  a computer readable storage medium readable by one or more processors and storing instructions for execution by the one or more processors for performing a method comprising:
    obtaining, by the one or more processors, from a client, permission to access one or more computing devices utilized by the client to monitor the client and interact with the client, wherein, for each computing device, the permission comprises identifications of one or more interfaces, wherein each identification is an identification of each interface utilized by the client to interact with the computing device, wherein the client can receive delivery of a computer-initiated interaction and can provide a response to the computer-initiated interaction, via each interface, wherein the computer-initiated interaction comprises a task comprising content, wherein the response comprises responsive content, and wherein the task is to be completed by the client and the response indicates a completion of the task;
    obtaining, by the one or more processors, the computer-initiated interaction, from a host communicatively coupled to the one or more processors, wherein the computer-initiated interaction requests the delivery to the client and the response from the client, wherein the response comprises an anticipated response to the task, wherein the anticipated response is in a defined format of a group of defined formats, wherein the defined format is accepted by only a portion of the identified one or more interfaces, and wherein content of the anticipated response can be communicated in each format of the group of defined formats;
    monitoring, by the one or more processors, via the accessing the one or more computing devices, activities performed by the client;
    determining, by the one or more processors, based on the monitoring, a real-time environmental context of the client at a point in time of receiving the computer-initiated interaction;
    cognitively analyzing, by the one or more processors, data and metadata of the computer-initiated interaction to determine attributes of the computer-initiated interaction; and
    designating, by the one or more processors, a given interface of a computing device selected from the one or more computing devices both to receive the delivery of the computer-initiated interaction and in which to obtain the response to the delivery of the computer-initiated interaction, wherein the delivery comprises the content, and wherein the response comprises the responsive content, wherein the designating is based on the real-time environmental context and the defined format of the anticipated response, wherein the real-time environmental context comprises privacy considerations related to the task and privacy considerations related to the anticipated response to the task via an interface of a computing device selected from the one or more computing devices to receive the delivery, wherein the privacy considerations related to the task and the privacy considerations related to the anticipated response are imposed by a physical location of the client at the point in time and one or more attributes of the attributes wherein the designation comprises:
      comparing, by the one or more processors, the real-time environmental context and the one or more attributes to an ontology of context-sensitive interfaces;
      identifying, by the one or more processors, within the ontology, one or more axioms relevant to the real-time environmental context and the one or more attributes; and
      designating, by the one or more processors, the interface of the computing device further, based on the identified one or more axioms and based the designated interface being able to accept the anticipated response in the defined format;
    transmitting, by the one or more processors, the computer-initiated interaction, to the designated given interface of the computing device at the point in time; and
    responsive to the delivery of the computer-initiated interaction to the designated given interface of the computing device, obtaining, by the one or more processors, the response to the computer-initiated interaction, via the designated given interface of the computing device in the defined format.

2. The computer program product of claim 1, the method further comprising:

determining, by the one or more processors, an order of priority relative to the one or more computing devices, for each computing device of the one or more computing devices, wherein the designating comprises evaluating each interface in the order, based on the real-time environmental context and one or more attributes of the attributes, and wherein the designated given interface is an interface of a highest priority computing device of the one or more computing devices.

3. The computer program product of claim 1, wherein the privacy considerations related to the task comprise privacy considerations imposed by the content, and wherein privacy considerations related to the anticipated response comprise privacy considerations related to the responsive content.

4. The computer program product of claim 1, wherein the group consists of: utilization of a graphical user interface (GUI), utilization of textual entry, and utilization of email.

5. The computer program product of claim 1, wherein the the group consists of: text, voice, haptic, command line, graphical user interface, menu driven interface, form-based interface, and natural language interface.

6. A system comprising:
a memory;
one or more processors in communication with the memory;
program instructions executable by the one or more processors via the memory to perform a method, the method comprising:
obtaining, by the one or more processors, from a client, permission to access one or more computing devices utilized by the client to monitor the client and interact with the client, wherein, for each computing device, the permission comprises identifications of one or more interfaces, wherein each identification is an identification of each interface utilized by the client to interact with the computing device, wherein the client can receive delivery of a computer-initiated interaction and can provide a response to the computer-initiated interaction, via each interface, wherein the computer-initiated interaction comprises a task comprising content, wherein the response comprises responsive content, and wherein the task is to be completed by the client and the response indicates a completion of the task;
obtaining, by the one or more processors, the computer-initiated interaction, from a host communicatively coupled to the one or more processors, wherein the computer-initiated interaction requests the delivery to the client and the response from the client, wherein the response comprises an anticipated response to the task, wherein the anticipated response is in a defined format of a group of defined formats, wherein the defined format is accepted by only a portion of the identified one or more interfaces, and wherein content of the anticipated response can be communicated in each format of the group of defined formats;
monitoring, by the one or more processors, via the accessing the one or more computing devices, activities performed by the client;
determining, by the one or more processors, based on the monitoring, a real-time environmental context of the client at a point in time of receiving the computer-initiated interaction;
cognitively analyzing, by the one or more processors, data and metadata of the computer-initiated interaction to determine attributes of the computer-initiated interaction; and
designating, by the one or more processors, a given interface of a computing device selected from the one or more computing devices both to receive the delivery of the computer-initiated interaction and in which to obtain the response to the delivery of the computer-initiated interaction, wherein the delivery comprises the content, and wherein the response comprises the responsive content, wherein the designating is based on the real-time environmental context and the defined format of the anticipated response, wherein the real-time environmental context comprises privacy considerations related to the task and privacy considerations related to the anticipated response to the task via an interface of a computing device selected from the one or more computing devices to receive the delivery, wherein the privacy considerations related to the task and the privacy considerations related to the anticipated response are imposed by a physical location of the client at the point in time and one or more attributes of the attributes, wherein the designation comprises:
comparing, by the one or more processors, the real-time environmental context and the one or more attributes to an ontology of context-sensitive interfaces;
identifying, by the one or more processors, within the ontology, one or more axioms relevant to the real-time environmental context and the one or more attributes; and
designating, by the one or more processors, the interface of the computing device further, based on the identified one or more axioms and based the designated interface being able to accept the anticipated response in the defined format;
transmitting, by the one or more processors, the computer-initiated interaction, to the designated given interface of the computing device at the point in time; and
responsive to the delivery of the computer-initiated interaction to the designated given interface of the computing device, obtaining, by the one or more processors, the response to the computer-initiated interaction, via the designated given interface of the computing device in the defined format.

7. The system of claim 6, wherein the privacy considerations related to the task comprise privacy considerations imposed by the content, and wherein privacy considerations related to the anticipated response comprise privacy considerations related to the responsive content.

8. The system of claim 6, wherein the group consists of: utilization of a graphical user interface (GUI), utilization of textual entry, and utilization of email.

9. The system of claim 6, wherein the group consists of: text, voice, haptic, command line, graphical user interface, menu driven interface, form-based interface, and natural language interface.

* * * * *